(12) United States Patent
Ryan et al.

(10) Patent No.: US 7,266,917 B2
(45) Date of Patent: Sep. 11, 2007

(54) IMAGE/ADVERTISING APPARATUS AND METHOD

(75) Inventors: Daniel R Ryan, Issaquah, WA (US); Rasheed El-Moslimany, Burien, WA (US); Douglas A Duim, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 10/882,047

(22) Filed: Jun. 30, 2004

(65) Prior Publication Data

US 2005/0050782 A1 Mar. 10, 2005

Related U.S. Application Data

(63) Continuation-in-part of application No. 10/656,090, filed on Sep. 5, 2003, now abandoned.

(51) Int. Cl.
*G09F 15/00* (2006.01)

(52) U.S. Cl. .......................... 40/606.07; 40/615; 40/594

(58) Field of Classification Search .................. 40/615, 40/594, 605, 606.07
See application file for complete search history.

(56) References Cited

U.S. PATENT DOCUMENTS

| | | | |
|---|---|---|---|
| 4,743,642 A | 5/1988 | Yanacek et al. | |
| 5,137,775 A * | 8/1992 | Davis et al. | 428/216 |
| 5,148,618 A * | 9/1992 | Brewster | 40/626 |
| 5,330,044 A | 7/1994 | Conklin, Jr. | |
| 5,427,227 A | 6/1995 | Candall et al. | |
| 5,658,411 A * | 8/1997 | Faykish | 156/233 |
| 6,004,421 A | 12/1999 | Landa | |
| 6,073,375 A | 6/2000 | Fant et al. | |
| 6,126,112 A | 10/2000 | Apel et al. | |
| 6,231,196 B1 | 5/2001 | Mahachek | |
| 6,241,187 B1 | 6/2001 | Apel et al. | |
| 6,460,805 B1 | 10/2002 | Sanz et al. | |
| 6,547,184 B2 | 4/2003 | Nieberle | |
| 6,665,969 B1 * | 12/2003 | Conway | 40/605 |
| 2002/0030139 A1 | 3/2002 | Apel et al. | |
| 2002/0109604 A1 | 8/2002 | Martin | |
| 2005/0052516 A1 | 3/2005 | Wilde et al. | |

FOREIGN PATENT DOCUMENTS

| | | |
|---|---|---|
| CH | 692 229 A5 | 3/2002 |
| EP | 1 108 753 | 6/2001 |
| WO | WO99/34347 * | 7/1999 |

* cited by examiner

*Primary Examiner*—Gary C. Hoge
(74) *Attorney, Agent, or Firm*—Harness, Dickey & Pierce, P.L.C.

(57) ABSTRACT

An advertising system and method in which an advertising mural is segmented and portions of the advertising mural are formed on each one of a plurality of laterally aligned overhead stowage bin doors in a commercial aircraft. Each segment of the advertising mural is formed on an independent, strippable laminate panel that is secured to its associated stowage bin door so as to be generally non-removable therefrom without the aide of a heat gun or like implement. Changing the advertising mural involves using a heat gun or like implement to remove each laminate panel from its associated bin door. New laminate panels collectively forming a different advertising mural can then be individually applied to the bin doors. Accordingly, the same bin doors can be re-used to present a different advertising mural.

21 Claims, 3 Drawing Sheets

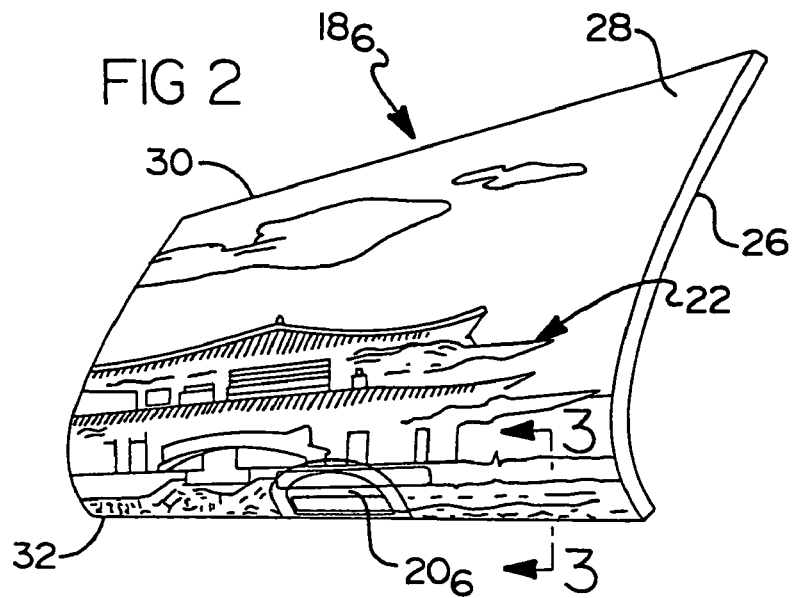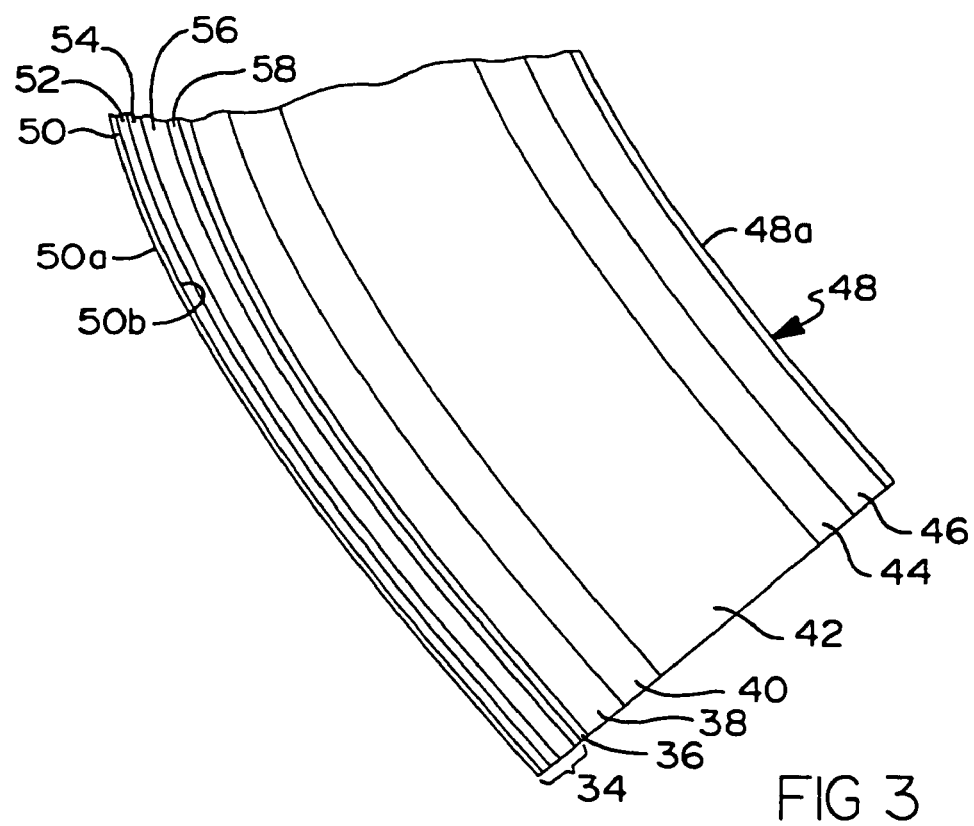

IMAGE/ADVERTISING APPARATUS AND METHOD

CROSS-REFERENCE TO RELATED APPLICATIONS

This application is a continuation-in-part of U.S. patent application Ser. No. 10/656,090 filed on Sep. 5, 2003, now abandoned the disclosure of which is incorporated herein by reference.

FIELD

The present disclosure relates to systems and methods for presenting images, and more particularly to a system and method especially well adapted for use on panels such as stowage bin doors used in an aircraft for presenting enlarged images in the form of multi-section murals, and particularly multi-section advertising murals.

BACKGROUND

In a commercial aircraft, a plurality of laterally aligned overhead stowage bin doors are typically included along the port and starboard sides of the passenger cabin of the aircraft. Larger commercial aircraft may even have one or more rows of overhead stowage bin doors located along a central area of the passenger cabin between a pair of aisles within the passenger cabin. Each of the stowage bins includes a door which can be raised by a passenger or crew member. The stowage bin doors, when closed, are readily visually apparent to the passengers and crew members within the passenger cabin area of the aircraft.

The stowage bin doors, when in their closed positions, form either relatively flat or only slightly curving surfaces. These doors could advantageously be used for supporting various images, murals or advertising messages. However, up until the present time, it has not been thought to provide laterally adjacent pluralities of stowage bin doors with segmented portions of a single image or advertising mural or message. Providing laterally adjacent stowage bin doors with segmented portions of a single advertising mural or advertising message would provide an opportunity for the airlines to use this space to generate advertising revenue through one or more advertising murals that are not only aesthetically pleasing to view, but unique from the standpoint that the entire advertising message can be presented in a much larger format than if only a single stowage bin door was employed for this purpose. Alternatively, a multi-section image or mural could be used to set a certain theme inside the aircraft.

It would further be advantageous if the segmented portions of an advertising mural could each be formed on laminate panels that could be quickly and easily secured to the stowage bin doors, and removed therefrom quickly and easily when a different advertising mural needs to be implemented. In this manner, an advertising mural could be changed without the need for replacement stowage bin doors. The same bin doors would be used but only the laminate panels secured to each would be removed and replaced with different laminate panels that present a different advertising mural.

SUMMARY

The present disclosure is directed to an image presenting system and method adapted for use with a plurality of adjacently disposed panels on a mobile platform. In one preferred form, the image/mural forms an advertising mural implemented through the use of a plurality of adjacently disposed interior panels on the mobile platform. In one preferred implementation the interior panels comprise overhead stowage bin doors on a mobile platform such as an aircraft. An advertising mural or other form of image or advertising message is segmented into several distinct sections, and the adjacent stowage bin doors incorporate the various sections so as to present the sections contiguously to form an ostensibly single, enlarged image, such as a mural. By using a plurality of interior panels, and particularly a plurality of stowage bin doors, to present the image or mural, the image or mural can be presented in a significantly enlarged form that provides a visually dramatic presentation thereof to occupants of the mobile platform.

It is also an important advantage of the present disclosure that the image/mural is formed on a laminate structure that can easily be secured to and removed from an outer surface of the panel to which it is secured, for example a stowage bin door. In one of various embodiments a laminate is formed by a first flexible layer having printed in ink on a surface thereof a portion of the message or mural. Against this image is secured a second flexible layer of material so that the two layers effectively sandwich the ink therebetween. The laminate is strippable so that it can be removed from the panel when the message or mural needs to be changed. In this manner the original panel can be reused to present a different mural.

Another important aspect of the present disclosure involves forming the laminate by using a printer to deposit an ink, and more preferably an ultraviolet (UV) curable and stable ink, directly on one layer of material forming a portion of the laminate. More preferably, the ink is deposited directly on one layer of polyvinyl fluoride film (PVF) used in the construction of the laminate. In one preferred implementation the UV curable and stable ink is deposited directly on a layer of Tedlar® PVF. The UV curable and stable ink is cured virtually immediately after being deposited on the Tedlar® PVF by a UV light operably associated with the printer, as the UV light passes over the newly deposited ink. The depositing of the UV curable and stable ink directly on the Tedlar® PVF eliminates the need for some type of coating to be formed over the Tedlar® PVF that would be necessary with water and solvent based inks.

BRIEF DESCRIPTION OF THE DRAWINGS

The present disclosure will become more fully understood from the detailed description and the accompanying drawings, wherein:

FIG. 2 is a perspective, enlarged view of one of the stowage bin doors shown in FIG. 1;

FIG. 3 is a side, cross sectional view of the stowage bin door of FIG. 2 taken in accordance with section line 3-3 in FIG. 2 showing the various layers comprising the bin door.

DETAILED DESCRIPTION OF VARIOUS EMBODIMENTS

The following description of the various embodiment(s) is merely exemplary in nature and is in no way intended to limit the disclosure, its application, or uses.

Figure 1:
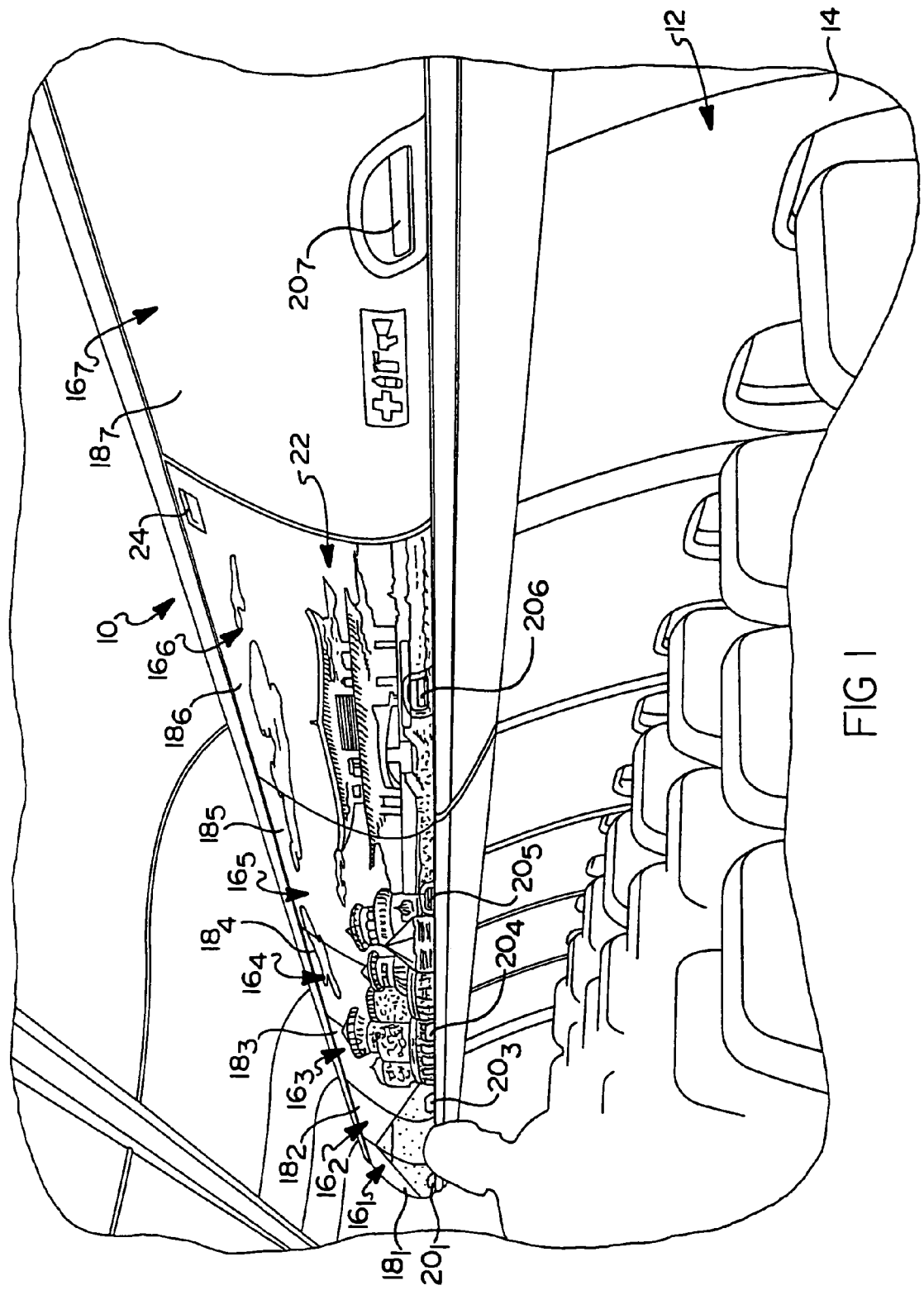
FIG. 1 is a simplified perspective view of a portion of an interior passenger cabin area of a commercial aircraft illustrating an advertising mural incorporated over a plurality of overhead stowage bin doors, in accordance with one of various embodiments of the present disclosure.

Referring to FIG. 1, there is shown an overhead stowage bin door system 10 in accordance with one of various embodiments of the present disclosure. The stowage bin door system 10 is disposed in a passenger cabin area 12 of a commercial aircraft 14. It will be appreciated that most typically, a commercial aircraft will include the stowage bin door system 10 on both the port and starboard sides of the passenger cabin 12. In larger commercial aircraft, such as a twin aisle aircraft, the stowage bin system 10 will also be present over the central area of the cabin (i.e., the area over the seats disposed between the two aisles).

The stowage bin system is comprised of a plurality of independent stowage bin doors $16_1$-$16_n$ which are laterally aligned to form a generally continuous overhead storage area. Each stowage bin $16_1$-$16_n$ includes an associated bin door $18_1$-$18_n$ which may be opened via an associated user-engageable handle $20_1$-$20_n$. The construction of each handle $20_1$-$20_n$ is conventional and will therefore not be described. In most instances, at least one stowage bin door 18 near a forward portion of the passenger cabin 12 is left free of any advertising message to comply with FAA regulations that require safety information to be present thereon with no other graphics or indicia that would detract from the noticeability of the safety information. Similarly, at least one bin door close to a midpoint of the passenger cabin area is left clear of advertising indicia, such as indicated by door $18_7$, and typically one stowage bin door 18 at a rear area of the passenger cabin 12 is left free of any advertising material so as not to obfuscate or detract from the visibility of the safety information.

It is a principal advantage of the stowage bin door system 10 that each bin door $18_1$-$18_n$ includes a portion (i.e., section) of an enlarged, advertising mural or message, or image which is designated by reference numeral 22. While reference may be made throughout the following text to an "advertising mural" 22, it will be appreciated that this includes any form of image, advertising message or display capable of being segmented into several distinct segments, and is not limited to only advertising images or messages. Since the bin doors $18_1$-$18_n$ are positioned laterally closely adjacent one another, when all of the bin doors are closed, a complete rendition of the single, enlarged image or advertising mural 22 is presented for viewing to the occupants within the passenger cabin 12.

Preferably the image or advertising mural 22 is comprised of vivid colors, although it will be appreciated that the colors employed on the mural 22 could be muted or otherwise selected to match or blend in with the colors of the seats, carpeting, etc. within the passenger cabin area 12. To the occupants within the passenger cabin area 12, the mural 22 appears as a single, relatively seamless, image or advertising message. A company logo 24 may be included on each bin door 18 or possibly only on a single one of the bin doors 18 that make up the advertising mural 22. The doors 18 that do not include a segment of the mural 22 form natural "breaks" or dividers which can be used to separate two or more distinct murals.

It will also be appreciated that the use of the bin doors 18 for advertising purposes can represent a means for additional revenue for an airline making use of the system 10 on its aircraft. The enlarged format of each mural 22 further serves to effectively attract and maintain the attention of occupants of the passenger cabin area 12. The mural 22 may also be selected to provide a certain theme within the aircraft, such as an oriental theme, if the aircraft is typically employed for travel to the Orient. Furthermore, depending upon the colors employed, the advertising mural 22 could help to provide a relaxing ambience within the aircraft 14 if the aircraft is employed on relatively long flights.

Referring to FIGS. 2 and 3, a first preferred implementation of the mural 22 will be described. In this implementation, various segments of the mural 22 are each integrally formed with their respective bin doors 18. Each bin door 18 includes an inner surface 26 and an outer surface 28. The inner surface 26, near an upper edge 30, typically includes one or more hinges (not shown) for enabling the bin door 18 to be secured to its associated storage bin 16. The handle $20_6$ is included along the lower edge 32 so as to be easily accessible by an occupant.

With specific reference to FIG. 3, the construction of the bin door $18_6$ will be described. Each bin door 18 comprises a decorative laminate subsection 34 made up of a plurality of independent layers, that will be described in detail momentarily. The decorative laminate section 34 is disposed against an adhesive layer 36 which may comprise spray or heat activated adhesive. One suitable adhesive is available from Bostic Findley, Inc. This adhesive layer is typically applied with a dry film coverage of 2 to 3 grams/ft2. The adhesive layer 36 is formed on a pre-preg fiberglass layer 38. Pre-preg fiberglass layer 38, in one preferred form, comprises a 120 weave style, although it will be appreciated that other weave styles could also be employed. Pre-preg fiberglass layer 38 is also positioned against a pre-preg fiberglass layer 40. Pre-preg fiberglass layer 40 may comprise a 181 weave style, but again, it will be appreciated that other weave styles could be employed. In addition, there may be small pieces (doublers) of prepreg material placed in key locations to improve surface and/or edge quality.

With further reference to FIG. 3, pre-preg fiberglass layer 40 is positioned against a honeycomb core 42 typically having a thickness in the range of preferably about 0.360 inch-0.500 inch (9.14 mm-12.7 mm). Again, this thickness could be varied. Also, the honeycomb core 42 could be "OX" formed (i.e., elongated more in the direction normal to the ribbon direction ) if desired. Preferably, additional pre-preg layers 44 and 46 are also formed against one another, with layer 44 being formed against the honeycomb core 42. Pre-preg fiberglass layer 44 preferably incorporates a 181 weave style while pre-preg fiberglass layer 46 preferably incorporates a 120 weave style, however, other weave styles could readily be incorporated. Finally, a polyvinyl layer 48 is placed against the pre-preg fiberglass layer 46 to form the inside surface. In one preferred form the polyvinyl layer 48 comprises a layer of Tedlar® PVF (polyvinyl fluoride) film having a thickness of preferably about 2 mills. The Tedlar® PVF layer 48 is also preferably opaque, and more preferably comprises a light color such as white, a light beige or a light grey. An outer surface 48a of the Tedlar® PVF layer essentially forms the inside surface 26 of the bin door and further preferably includes a slight texture which is maintained by the resins in the pre-preg fiberglass layers 46 and 44 once these layers cure during the manufacturing process.

With further reference to FIG. 3, the decorative textured laminate layer 34 will now be described. Layer 34 forms the outer surface 28 of the bin door $18_6$. However, it will be appreciated that laminate 34 could be used to help form a variety of structural or decorative panels able to be used in a mobile platform, or even in a fixed (i.e., non-mobile) structure, and is further not limited to use with only fiberglass pre-preg supporting panels or with a honeycomb support layer. Laminate 34 is comprised of a very thin polyvinyl film 50 having a texture on its outer surface 50a. Film 50, in one preferred form, comprises a Tedlar® PVF film having a thickness of preferably about 1 mill. The Tedlar® PVF film 50 is also preferably a clear gloss or a semi-gloss layer, but in either event it is substantially translucent. Layer 52 represents the ink that comprises the image of advertising mural 22. The ink layer 52 is formed on an inside surface 50b of the polyvinyl film 50. This eliminates the need to place a protective, separate layer over film 50, since film 50, itself, forms a protective covering for the ink on its inside surface 50b. A second polyvinyl film 54 is preferably disposed against the inside surface 50b of PVF film 50. Film 54 also preferably comprises a Tedlar® PVF layer that is preferably white in color to form a suitable background against which the colors of the ink layer 52 stand out. However, it will be appreciated that other colors could be employed depending on the color scheme used in the mural 22. Also, since the ink layer 52 is deposited on the inside surface 50b, it will be appreciated that the image or advertising mural 22 will need to be transposed during the printing process so that it appears correct when being viewed from the opposite side (i.e., outer surface 50a) of layer 50. Alternatively, the ink layer 52 could be formed on the second film 54, which would also eliminate the need to transpose the image during the printing process.

It is an important aspect of the construction of the stowage bin door 18 of the present disclosure that the ink layer 52 is deposited by a suitable printer, and more preferably by a digital ink jet printer, directly on the Tedlar® PVF film 50. The ink used to form ink layer 52, which makes up the mural 22, preferably comprises an ultraviolet (UV) curable and stable ink (black or colored) that is deposited directly on the Tedlar® PVF film 50. The ink is cured virtually immediately after being deposited by the ink jet printer via a UV light operably associated with the digital ink jet printer that passes over the newly deposited ink as the ink is deposited. The use of UV curable ink allows the ink to be deposited directly on the Tedlar® PVF film 50 (or even on film 54) without the need for some type of receptive coating to be placed over Tedlar® PVF film 50 or 54, which would be necessary with water or solvent based digital ink jet inks. Advantageously, the Tedlar® PVF films 50 and 54 form a fireworthy material that meets Federal Aviation Administration fire safety requirements for materials used on commercial aircraft. The ability of the UV curable ink to be cured virtually immediately after being deposited on the Tedlar® PVF films 50 or 54 also simplifies and expedites the manufacturing of the laminate 34. In addition, UV curable inks allow ink loadings on the Tedlar® PVF in excess of 300% which is difficult, or impossible, to obtain using water or solvent based digital ink jet inks The decorative textured laminate 34 further includes a layer 56 comprised of an embossing resin and another layer of polyvinyl material 58 which is disposed against the adhesive layer 36. Polyvinyl layer 58 also preferably comprises a Tedlar® PVF material having a thickness of preferably around 2 mills. Layer 58 is also preferably white in color. The layer of embossing resin 56 may vary significantly, but in one preferred form comprises an areal weight of 0.023 lb/ft$^2$ to 0.031 lb/ft$^2$.

As described above, the ink layer 52 is most preferably applied by a suitable ink jet printer or printing process. Companies making suitable ink jet printers or printing equipment are Vutek of Meredith, N.H. and 3M Corp. of Maplewood, Minn. Other suitable inks are available from Sericol, Inc. of Kansas City, Kans. and Sunjet of Bath, England. The color image formed by the advertising mural 22, in one preferred form, comprises a high contrast color image which is highly aesthetically pleasing to view. The decorative textured laminate 34 is formed in a conventional multi-opening press which uses heat and pressure to laminate the individual layers making up section 34 together as a single, decorative, textured laminate structure. The textured outer surface 50a of the Tedlar® PVF film 50 is maintained by the embossing resin of layer 56 as the resin cures in the multi-opening press during manufacture. The decorative textured laminate section 34 is then combined with the remaining layers 36-48 in a conventional vacuum forming IR oven to form the remainder of the stowage bin door 18. Some trimming of excess material or edge wrapping of laminate section 34 may be required to achieve maximum aesthetic appeal.

With the embodiment described above, the various sections of the mural 22 each form integral portions of their respective bin doors 18. Thus, changing of the mural 22 can be accomplished quickly and easily simply by removing the bin doors 18 that have the mural 22 thereon and substituting a different set of bin doors with a different mural.

Figure 4:
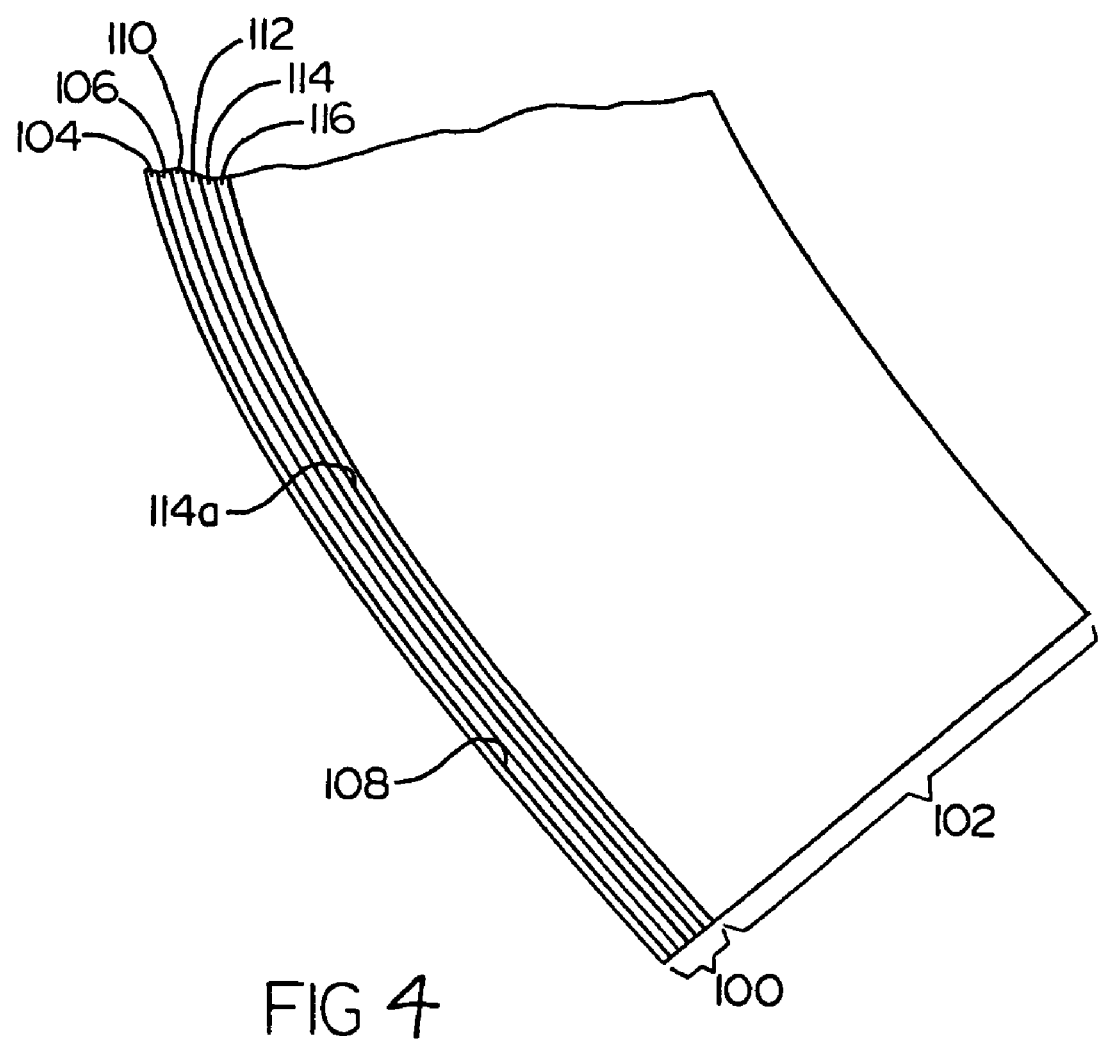
FIG. 4 is a side, cross sectional view of the stowage bin door having secured thereto a strippable laminate layer, in accordance with an alternative preferred embodiment of the present disclosure.

Referring to FIG. 4, there is shown an alternative preferred form of implementation of the bin door system of the present disclosure that makes use of a strippable laminate panel secured to an associated bin door 18. One such strippable laminate panel is designated by reference numeral 100, and the bin door by 102. With this embodiment the advertising mural or message 22 can be changed simply be removing the bin doors 102 from the aircraft and removing each of the strippable laminate panels 100 from their respective bin doors 102, and then applying a new strippable laminate panel having a different advertising message or mural. Thus, there is no need for a new set of stowage bin doors. Furthermore, the strippable laminate panels 100 could also be removed, and new strippable laminate panels applied to the bin doors 102, without removing the bin doors 102 from the aircraft.

In FIG. 4, the laminate panel 100 can be seen to be similar in construction to laminate panel 34. Panel 100 includes a thin polyvinyl film 104 having a texture on its outer surface 106. Film 104 preferably comprises a Tedlar® PVF film having a thickness of preferably about 1 mill. The Tedlar® PVF film 104 is also preferably a clear gloss or a semi-gloss layer, but in either event it is substantially translucent. Layer 106 represents the ink layer that comprises the image of advertising mural 22. The ink layer 106 is formed on an inside surface 108 of the PVF film 104, and thus there is no need to place a separate, protective, separate layer over PVF film 104. A second PVF film 110 is preferably disposed against the inside surface 108 of PVF film 104. The inside surface typically has a very thin adhesive layer left after the backing of the Tedlar® PVF layer 104 is removed, and the ink layer 106 is deposited on this adhesive. PVF film 110 also preferably comprises a Tedlar® PVF layer that is colored to form a suitable background against which the colors of the ink layer 106 stand out. Alternatively, the ink layer 106 could be formed on the second PVF film 108.

As with laminate panel, 34 the ink layer 106 is deposited by a suitable printer, and more preferably by a digital ink jet printer, directly on the PVF film 104. The ink used to form ink layer 106, which makes up the mural 22, preferably comprises an ultraviolet (UV) curable and stable ink (black or colored).

The decorative textured laminate 100 further includes a layer 112 comprised of an embossing resin, another layer of PVF material 114 disposed against layer 112, and an adhesive layer 116 formed on PVF film 114. Adhesive layer 116 is heat activated and "strippable", meaning that it allows the laminate panel 100 to be easily and quickly removed by the application of heat from a heat gun. A suitable adhesive for this purpose is SPA 110-.4, available from Bostik-Findley, Inc., of Huntington Valley, Pa. The adhesive layer 116 may be temporarily covered, before the laminate panel 100 is applied, by a thin, removable release layer of plastic or other material. Once the release layer is removed, the laminate panel can be positioned over its respective bin door 102 and carefully laid onto the outer surface of the bin door. Pressure with a roller or other implement can be used to smooth out the laminate panel 100 and to remove air bubbles. Alternatively, the exposed surface 114a of PVF film 114 could be left dry (i.e., no adhesive applied thereto), and at the time the laminate panel 100 is to be installed on the bin door 102, a suitable spray adhesive could be sprayed onto the exposed surface 114a of PVF film 114, or possibly onto the outer surface of the bin door 102. PVF film 114 also preferably comprises a Tedlar® PVF material having a thickness of preferably around 2 mills. The layer of embossing resin 112 also preferably comprises an areal weight of 0.023 lb/ft$^2$ to 0.031 lb/ft$^2$.

Stripping an installed laminate panel 100 from its associated bin door 102 can be accomplished simply by heating the laminate panel 100 with a heat gun or other like implement. Once heated sufficiently, the laminate panel 100 can be peeled off of its bin door 102. Typically there will be little or no residue left behind on the outer surface of the bin door 102. Any residual adhesive that may be left can be easily and quickly cleaned with a mild cleaning detergent, or possibly soapy water. The bin door 102 is then ready to receive a new laminate panel comprising a segment of a different advertising mural or message.

The apparatus and method of the present disclosure thus enables images, advertising murals or messages to be implemented using the stowage bin doors of an aircraft in a manner that does not interfere with use of the stowage bin doors, and further that does not interfere with maintenance of the aircraft or with any of the safety designations on various ones of the stowage bin doors. Importantly, the advertising murals contemplated by the present disclosure form an aesthetically pleasing appearance and can add to the ambience within the passenger cabin area of an aircraft. The present disclosure is also expected to be an important source of revenue to an airline incorporating the disclosure on the aircraft it operates.

It will also be appreciated that while the stowage bin doors form a particularly convenient surface for presenting the mural 22, other interior surfaces, such as a ceiling area, could just as readily be employed for the purpose of presenting the mural. Such an area would be more suitable for presenting a mural that is not intended to be changed frequently, whereas the stowage bin doors are ideally suited for murals that will be changed periodically.

While various embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. An apparatus adapted for use in connection with a plurality of functional door panels on a mobile platform for displaying an image, the apparatus comprising:
   a first door panel having a first laminate panel depicting a first portion of an image;
   a second door panel located contiguous to said first door panel and having a second laminate panel depicting a second portion of said image;
   each of said first and second laminate panels including:
      an ink layer that forms the image;
      an embossing resin layer;
      a first film layer disposed adjacent to said ink layer;
      a second film layer disposed between said ink layer and said embossing resin layer;
      a third film layer disposed between said embossing resin layer and an adhesive layer;
   said first and second laminate panels are removable from their respective door panels such that a different set of door panels having a different image can be implemented; and
   said first and second door panals cooperate to form at least a contiguous portion of said image.

2. The apparatus of claim 1, wherein each of said first and second door panels comprises a stowage bin door operatively coupled to a respective stowage bin.

3. The apparatus of claim 1, wherein said image is comprised of a high contrast color image.

4. The apparatus of claim 1, wherein said image comprises an advertising mural.

5. The apparatus of claim 1, wherein each said laminate panel comprises a strippable laminate panel that is removable from its associated said door panel.

6. The apparatus of claim 5, wherein each of said first, second, and third film layer is comprised of a polyvinyl fluoride (PVF) film.

7. The apparatus of claim 6, wherein each said strippable laminate panel further comprises a strippable adhesive layer.

8. The apparatus of claim 5, further comprising a strippable, spray on adhesive applied to one of a surface of one of said pair of PVF film layers and said door panel.

9. An advertising system adapted for use in connection with a plurality of stowage bin doors on a mobile platform, the system comprising:
   a first stowage bin door having a first portion of an advertising mural, said first portion of said advertising mural including a color stable image formed on a first strippable laminate panel associated with said first stowage bin door;
   a second stowage bin door having a second portion of said advertising mural, and disposed laterally adjacent and contiguous with said first stowage bin door, and having a color image formed on a second, strippable laminate panel associated with said second stowage bin door;
   each of said first and second strippable laminate Danels including:
      an ink layer that forms the image;
      an adhesive layer that releasably couples said first and second laminate panels to said first and second stowage bin doors;
      a first film layer disposed adjacent to said ink layer;
      a second film layer disposed adjacent to said ink layer;
      a third film layer disposed between said second film layer and said adhesive layer; and
   said first and second portions of said advertising mural cooperate to form at least a contiguous portion of said advertising mural.

10. The system of claim 9, wherein said color stable image comprises at least one ultraviolet (UV) stable color.

11. The system of claim 10, wherein said first, second and third film layer each comprise polyvinyl fluoride (PVF) film.

12. An advertising system for use with an interior area of an aircraft, comprising:
   a first panel viewable from within a cabin area of said aircraft, said first panel having a first portion of an advertising mural presented on a first, strippable laminate surface portion removably secured to said first panel;
   a second panel also viewable from within said cabin area and disposed contiguous to said first panel, and having a second, strippable laminate surface portion including a second portion of said advertising mural, wherein said second, strippable laminate surface portion is removably formed to said second panel;
   each of said first and second laminate panels including:
      an ink layer that forms the image;
      an embossing resin layer;
      a first film layer disposed adjacent to said ink layer;
      a second film layer disposed between said ink layer and an embossing resin layer;
      a third film layer disposed between said embossing resin layer and said adhesive layer;
   said first and second panels configured to present said strippable, laminate surface portions of said advertising mural in a manner such that a contiguous portion of said advertising mural is presented to an occupant of said aircraft; and
   said first and second strippable laminate surface portions quickly removable from their respective panels so that a different plurality of strippable laminate surface portions comprising a different mural can be installed within said aircraft.

13. The advertising system of claim 12, wherein each of said first and second panels comprises a door of an associated overhead stowage bin.

14. The advertising system of claim 12, wherein said first and second panels are disposed laterally adjacent one another to form a generally continuous area.

15. The advertising system of claim 12, wherein each of said strippable laminate surface portions includes at least a pair of polyvinyl fluoride (PVF) film layers, with one of the PVF layers including an ink layer thereon forming one of said portions of said advertising mural.

16. A method for presenting an enlarged image within an interior area of an aircraft through the use of laterally aligned stowage bin doors on the aircraft, the method comprising:
   dividing said enlarged image into at least first and second portions;
   forming said first portion as a first image on a first laminate panel of a first one of the stowage bin doors, said first laminate panel strippable from said first stowage bin door;
   forming said second portion of said enlarged image as a second image on a second laminate panel of a second one of said stowage bins, the second laminate panel is strippable from said second stowage bin door;
   forming each of said first and second laminate Danels as a composite of a plurality of layers, the layers including an ink layer that forms the image, an embossing resin layer, a first film layer disposed adjacent to said ink layer, a second film layer disposed between said ink layer and said embossing resin layer and a third film layer disposed between said embossing resin layer and an adhesive layer; and
   securing said stowage bin doors to laterally adjacent and contiguous stowage bins on said aircraft such that said stowage bin doors collectively provide said images in a manner that forms at least a contiguous portion of said advertising mural.

17. The method of claim 16, wherein forming said first and second portions of said enlarged image comprises forming first and second sections of an advertising mural.

18. The method of claim 17, wherein said first and second portions of said advertising mural comprise ultraviolet stable color images.

19. The method of claim 18, wherein forming each of said first and second laminate panels further comprises forming polyvinyl the first, second and third film layers out of fluoride (PVF) films, and further forming the first and second laminate panels such that said ink layer is sandwiched between a pair of PVF films.

20. The method of claim 19, further comprising forming a strippable adhesive layer on a surface of one of said PVF films.

21. The method of claim 20, further comprising placing an embossing resin layer over one of said PVF films.

* * * * *